United States Patent [19]

McRoskey

[11] Patent Number: 5,064,325

[45] Date of Patent: Nov. 12, 1991

[54] THUMBNUT CONSTRUCTION

[75] Inventor: John W. McRoskey, Rancho Santa Fe, Calif.

[73] Assignee: Republic Tool & Manufacturing Corp., Carlsbad, Calif.

[21] Appl. No.: 685,684

[22] Filed: Apr. 16, 1991

[51] Int. Cl.⁵ .................... F16B 33/00; F16B 37/16
[52] U.S. Cl. ................................ 411/368; 411/301; 411/432; 411/435; 403/320; 403/408.1
[58] Field of Search ............. 411/128, 131, 134, 135, 411/141, 368, 369, 377, 431, 432, 435, 301, 302, 959; 403/320, 380, 388, 408.1; 439/801

[56] References Cited

U.S. PATENT DOCUMENTS

| 244,379 | 7/1881 | Coulter et al. | 411/435 |
|---|---|---|---|
| 812,294 | 2/1906 | Reed . | |
| 830,572 | 9/1906 | Cutter . | |
| 887,962 | 5/1908 | Reisner . | |
| 1,923,647 | 8/1933 | Vera | 411/188 |
| 1,952,305 | 3/1934 | Beck . | |
| 2,827,973 | 3/1958 | Coleman | 411/435 |
| 3,262,480 | 7/1966 | Storch | 411/432 |
| 3,825,051 | 7/1944 | Sigmund . | |
| 4,068,555 | 1/1978 | Volkman . | |
| 4,472,097 | 4/1984 | Keifer et al. | 411/369 |
| 4,790,208 | 12/1988 | Johnson | 411/189 |

FOREIGN PATENT DOCUMENTS

| 8662 | of 1898 | United Kingdom | 411/161 |
|---|---|---|---|
| 581061 | 9/1946 | United Kingdom | 411/435 |

Primary Examiner—Neill R. Wilson
Attorney, Agent, or Firm—Harry Williams

[57] ABSTRACT

A thumbnut for use with a convex surface is provided with a plastic sheath in which the bottom face thereof has a series of projections arranged in a circumferential manner like the numerals on a clock face. Once the thumbnut is threadedly engaged with a bolt extending from the convex surface, these projections react in a ratchet-like manner with that surface. As the thumb nut is tightened the projections cause it to move alternatively from unstable "override" positions to stable "straddle" positions which effectively lock the thumbnut with respect to the convex surface, regardless of the amount of torque applied to the thumbnut.

8 Claims, 1 Drawing Sheet

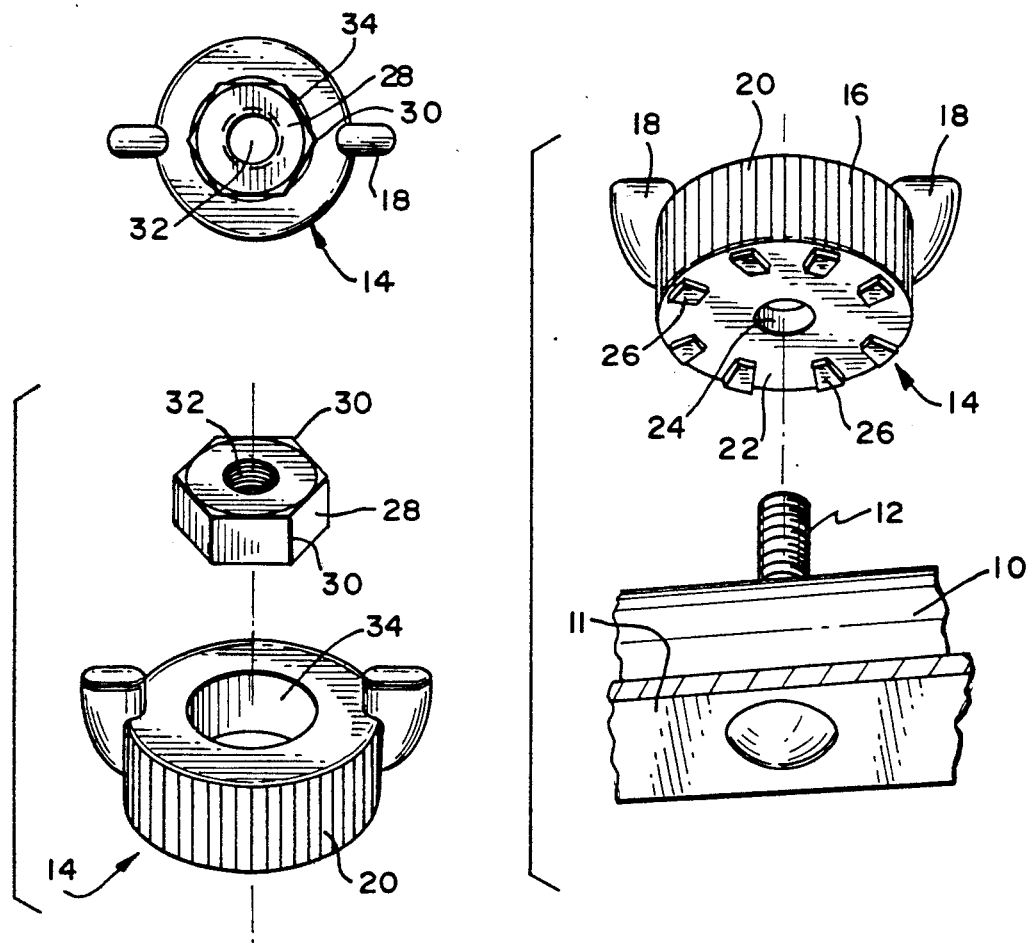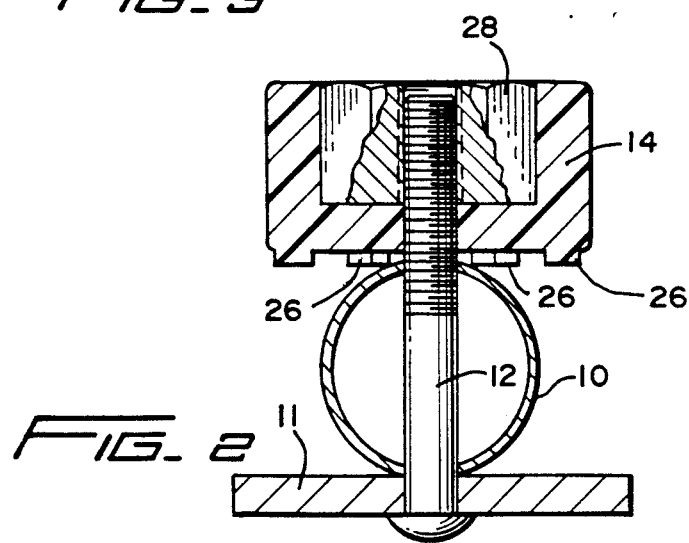

THUMBNUT CONSTRUCTION

BACKGROUND OF THE INVENTION

This invention relates to thumbnuts and/or wingnuts and their specific use.

In the past various attempts have been made to provide thumbnuts for use with articles of manufacture during the assembly thereof, particularly in the case of consumer assembly where the criteria for assembly should be ease and quickness in which the use of tools is kept to a minimum. One example of such an article of manufacture is a hand cart or wheelbarrow disclosed in U.S. Pat. Nos. 4,991,716 and 4,889,360 assigned to the present assignee, in which the consumer is invited to assemble the product without the need of any tools whatsoever. In such cases the various thumbnuts or wingnuts provided with the product and used to secure the various parts of the product together have to be sufficiently tightened in order for the product to operate in a safe manner. In such cases, recourse to a tool, such as a wrench and the like, is sometimes necessary to insure that the nuts are tightened, especially if the consumer lacks sufficient manual strength to tighten the nuts in a workman-like manner.

There is a need, therefore, to provide thumbnuts or wingnuts which can be tightened sufficiently by anyone, regardless of their individual strengths, in order to implement the assembly of a product, such as described above, in which a tubular member is secured to another member and in which the thumbnuts so provided are caused to be secured in a simple and an easily tightenable manner without fear of the nuts being subsequently loosened during normal use of the product.

SUMMARY AND OBJECTS OF THE INVENTION

In answering the aforementioned needs in the art of thumbnut or wingnut construction, the present invention has for its primary purpose and main objective the provision of a simple and cost-effective thumbnut which can be used by the consumer in assembling any product that uses tubular members in conjunction with other members and which when applied can be easily tightened to an effective locking position without the need of a tightening tool.

It is another object of the invention to provide a thumbnut which can be easily tightened with respect to a tubular member so that the nut remains in a stable non-reversing position, regardless of the amount of torque applied to the thumbnut in securing same to the tubular member, while at the same allowing the thumbnut to be reversed by hand should such a reverse torque be applied for loosening the thumbnut.

In accordance with one embodiment of the invention a thumbnut is provided with a plastic sheath in which the bottom face thereof is provided with a series of projections arranged in a circumferential manner like the numerals on a clock face. Once the thumbnut is threaddedly engaged with a bolt extending at right angles from the apex of a tubular member, these projections will react in a ratchet-like manner over the curved or convex surface of the tubular member as the thumbnut rotatably engages that surface. Thus, opposed projections of successive pairs of projections will "override" the curved surface of the tubular member as the thumbnut is tightened. Between each "override" position of opposed projections will be a "straddle" position in which the opposed projections of adjacent pairs of projections will "straddle" the apex of the curved surface of the tubular member, serving to lock the thumbnut with respect to the tubular member when the thumbnut is left in that position. As the thumb nut is tightened it moves alternatively from unstable "override" positions to stable "straddle" positions. A high degree of torque or a low degree of torque will have the same effect in positioning the thumbnut in any one of a number of "straddle" positions, so that the locking ability of the thumbnut, according to the invention, is not dependent upon increased torque for its locking effect but rather on sufficient torque which may include a range of torque values—from weak to strong—to position the thumbnut in any one of its "straddle" positions.

In accordance the invention the thumbnut may be constructed from a plain hexagonal nut which is force-fitted into a plastic sheath having a round opening therein for receiving the nut. The plastic sheath may be provided with a knurled peripheral surface or with "wings" or with both for facilitating rotation in the conventional manner with thumb and forefinger. The edges of the standard hexagonal nut, once force-fitted into the opening of the sheath, will fix the nut in place so that the thumbnut composed of nut and sheath will rotate as a unit. Alternatively, a threaded sleeve having a knurled exterior surface can be used for the threaded portion of the thumbnut and the sleeve can be tapped, pressed or sonically inserted in place, or it can be molded in place by insert molding techniques, or, finally, the thumbnut itself may be molded entirely of plastic.

The invention will be better understood and further objects and advantages thereof will become more apparent from the ensuing detailed description of the preferred embodiments taking in conjunction with the drawings.

BRIEF DESCRIPTION OF THE DRAWINGS

FIG. 1 is schematic perspective explosive view of the invention used with a tubular member and bolt extending therethrough;

FIG. 2 is a schematic cross-section of the thumbnut according to the invention in its locked position with respect to a tubular member;

FIG. 3 is a schematic explosive view of the nut and the plastic sheath, illustrating the method of forming the thumbnut according to the invention; and FIG. 4 is a schematic plan view of the formed thumbnut according to the invention.

DETAILED DESCRIPTION

Referring now to FIGS. 1 and 2, there is shown a tubular member 10 (see FIG. 2) having a threaded bolt 12 passing therethrough and extending from the apex thereof with respect to the convex surface of the tubular member. A second member 11 which may be of any shape but is preferably shown as a flat-faced member is secured to the tubular member 10 by means of the bolt 12 traversing both members 10 and 11 and the thumbnut 14, as shown in FIG. 2. The threaded portion of the bolt 12 extending from the apex of the convex surface of the member 10 will receive the thumbnut 14, which is shown to have a plastic sheath housing 16 of a generally cylindrical shape. As shown in FIG. 1, the thumb nut is preferably provided with "wing" members 18 as well as a knurled peripheral edge 20 in order to facilitate rotation in the conventional manner. The bottom face 22 of the plastic sheath 16 is seen to have a central aperture 24 which is slightly larger in diameter than the diameter of the bolt 12. Arranged circumferentially around the edge of the bottom face 22 are a series of generally wedge-shaped rectangular projections 26.

As shown in FIG. 2, the projections 26 serve a unique function in causing the thumbnut to lock in place in any one of several stable positions, that is, "straddle" positions in which, as shown, adjacent projections straddle the convex surface of the tubular member 10 about the bolt 12. It will be understood, of course, that four such projections, constituting adjacent pairs of opposed projections, will straddle the tubular member in anyone of the aforementioned stable positions when the thumbnut 14 is tightened sufficiently so as to ride on the convex surface of the tube 10. As the thumbnut is rotated about the bolt 12 and the threaded portion of the bolt engages the threaded portion of a nut member 28 contained in the plastic sheath housing 16, as shown, the thumbnut is drawn down on the convex surface and the projections 26 on the bottom face of the thumbnut will begin to pass over the apex of the convex surface of the tubular member causing a "ratcheting" effect. Each pair of opposed projection members will "override" the tubular member as the thumbnut is rotated or tightened, each override defining an unstable position of the thumbnut with respect to the tubular member 10, and between each override position, when adjacent pairs of opposed projections straddle the convex surface of the tubular member, a stable locking position will be defined for the thumbnut. Once the thumbnut is rotated sufficiently enough so that a range of stable or "straddle" positions are encountered, rotation or tightening of the thumbnut can cease, leaving the thumbnut in one its stable or locked positions in which the aforementioned projections are straddling the convex surface of the tubular member 10. It will be seen, then, that the thumbnut need not be tightened with the maximum torque in order to render it "tight." Once the thumbnut is left in one of the stable or "straddle" positions as above defined, it will be effectively locked in place and will not reverse during subsequent use of the article or product in which the thumbnut is used. Should it be desirable to loosen the thumbnut, then simply reversing the rotation of the thumbnut will loosen same.

FIGS. 3 and 4 show the specific construction of the thumbnut An ordinary metallic hexagonal nut 28 is shown having edges 30 defining the hexagonal faces thereof and, further, a central threaded aperture 32. The nut 28 is disposed above a circular aperture 34 in the plastic sheath housing 16, as shown in FIG. 3, and as shown in FIG. 4, the nut 28 is force-fitted into the circular aperture 34 in the plastic sheath housing 16 by virtue of the aperture 34 being slightly smaller in diameter than the outside diameter of the nut 28, that is, between opposing edges 30. In this way the edges 30 cut into the plastic as the nut is press-fitted into the aperture 34, thus insuring a tight rigid fit between nut and plastic housing. Once the nut is so formed, the threaded aperture 32 of the nut is coaxially aligned with the central aperture 24 on the bottom face 22 of the plastic sheath housing 16 (see FIG. 2). Alternatively, threaded metal inserts may be used in place of the nut, or, on the other hand, the entire thumbnut itself can be molded, including the central threaded aperture, as one piece.

The foregoing relates to a preferred exemplary embodiments of the present invention, it being understood that other embodiments and variants thereof are possible within the scope of the invention, the latter being defined by the appended claims.

What is claimed and desired to be secured by Letters Patent of the United States is:

1. A thumbnut for use with a threaded bolt traversing a first member and a second member, comprising
   a portion of said first member having a convex surface,
   said threaded bolt extending from the apex of said convex surface,
   a series of spaced apart projections circumferentially arranged on a bottom surface of said thumbnut with respect to a central threaded aperture thereof, said projections successively engaging said convex surface when said thumbnut is rotated about said bolt member to engage said convex surface, whereby opposed projections of adjacent pairs of said projections will successively straddle the apex of said convex surface to thereby define a plural number of stable positions for said thumbnut with respect to said convex surface.

2. A thumbnut according to claim 1, further comprising a plastic sheath member, and said central threaded aperture further comprising a metal insert member disposed within said plastic sheath member.

3. A thumbnut according to claim 2, wherein said metal insert comprises a hexagonal nut which is press-fitted into a circular aperture in said plastic sheath member.

4. A thumbnut according to claim 2, wherein said plastic sheath member comprises means for facilitating manual rotation of said thumbnut.

5. A thumbnut according to claim 1, wherein said projections are generally wedge-shaped with their respective long axes being normal to and intersecting the axis of said threaded aperture.

6. A thumbnut according to claim 1, wherein the entire structure of said thumbnut is composed of plastic, including said central threaded aperture.

7. A thumbnut for use with a threaded bolt traversing a first member and a second member, comprising
   a portion of said first member having a convex surface,
   said threaded bolt extending from the apex of said convex surface,
   a plastic sheath having a bottom surface and a central aperture extending therethrough,
   a metallic threaded sleeve member disposed in said central aperture,
   a series of spaced apart projections circumferentially arranged on said bottom surface of said plastic sheath with respect to said central aperture, said projections successively engaging said convex surface when said thumbnut is rotated about said bolt member to engage said convex surface, whereby opposed projections of adjacent pairs of said projections will successively straddle the apex of said convex surface to thereby define a plural number of stable positions for said thumbnut with respect to said convex surface.

8. A thumbnut for use with a convex surface, comprising
   a threaded bolt member extending from the apex of said convex surface
   a plastic sheath member having a circular opening in one face thereof and a smaller central aperture coaxial with said circular opening in an opposing face thereof, a metal hexagonal nut member press-fitted into said circular opening of said plastic sheath member and having a threaded aperture therein for threadedly engaging said bolt member, and a series of spaced apart projections circumferentially arranged on said opposing face of said plastic sheath member with respect to said central aperture for successively engaging said convex surface when said thumbnut is rotated about said bolt member to engage said convex surface, whereby opposed projections of adjacent pairs of said projections will successively straddle the apex of said convex surface to thereby define a number of stable positions for said thumbnut with respect to said convex surface.

* * * * *